March 20, 1973     D. G. HAFFNER     3,721,078

PEDAL CONTROLLED HINGED CHUTE FOR LAWN MOWERS

Filed June 19, 1972     2 Sheets-Sheet 1

March 20, 1973   D. G. HAFFNER   3,721,078
PEDAL CONTROLLED HINGED CHUTE FOR LAWN MOWERS
Filed June 19, 1972   2 Sheets-Sheet 2

United States Patent Office 3,721,078
Patented Mar. 20, 1973

3,721,078
PEDAL CONTROLLED HINGED CHUTE FOR
LAWN MOWERS
Donald G. Haffner, Greendale, Wis., assignor to Jacobson Manufacturing Company, Racine, Wis.
Filed June 19, 1972, Ser. No. 263,781
Int. Cl. A01d 35/22
U.S. Cl. 56—202        7 Claims

ABSTRACT OF THE DISCLOSURE

A pedal controlled hinged chute for lawn mowers of the rotary type having a housing and a lateral discharge for the grass clippings. A chute is hingedly mounted on the housing on a horizontal axis and moves between a horizontally extended position and a raised position which exposes the mower discharge outlet. A foot pedal is pivotally mounted on the mower and through a spring it is connected to the hinged chute such that depressing the pedal causes the chute to move upwardly and expose the outlet and permit mounting a grass catcher bag on the mower housing. A stop is on the housing to limit the downward movement of the pedal, and a fastener extends between the chute and the housing to releasably hold the chute in its downward position.

This invention relates to a pedal controlled hinged chute for lawn mowers of the rotary type and having lateral discharges and which are arranged to accommodate a grass catcher bag.

BACKGROUND OF THE INVENTION

Rotary lawn mowers commonly are provided with grass catcher bags extending laterally of the mower and being in flow communication with the stream of grass clippings exhausted by the mower. These mowers are also commonly used without the catcher, though provision is made for mounting the catcher on the mower as mentioned. Therefore, it is a concern in the art to provide a rotary mower with a catcher which can be either mounted on the mower or which can be removed from the mower so that the mower can be used without the catcher. Ease and facility of mounting and removing the catcher are of concern. That is, the operator frequently removes the catcher from the mower either for emptying the catcher or for running the mower without the catcher, and, it is also important that the safety aspects of the mower be considered when the catcher is being mounted or removed and when the mower is being operated without the catcher.

Accordingly, it is a general object of this invention to provide a hinged chute for rotary lawn mowers and to take into consideration the aforementioned problems. More specifically, it is an object of this invention to provide a hinged chute for a rotary lawn mower wherein the chute deflects and guides the clippings being exhausted by the mower, when the chute is in its down and operating position, and wherein the chute is arranged so that the grass catcher bag can be easily mounted and removed as desired. In accomplishing these objectives, it will be understood that the grass catcher bag is mounted and utilized alternatively to the location and function of the hinged mower chute such that one uses either the bag or the chute. Accordingly, it will be appreciated and understood that it is significant to permit the operator to use both hands in mounting and removing the catcher from the mower, and it is also important that the operator be in a safe and stable position when he is mounting or removing the bag.

Another object of this invention is the provision of a pedal controlled hinged chute for lawn mowers wherein the chute can be releasably held in either its downward operating position or it can be readily and easily moved upwardly and out of the way for the purpose of mounting or removing the grass catcher bag relative to the mower, all with a minimum of skill and manipulation required on the part of the operator.

Other objects and advantages will become apparent upon reading the following disclosure.

DETAILED DESCRIPTION OF THE PREFERRED EMBODIMENT

Figure 1:
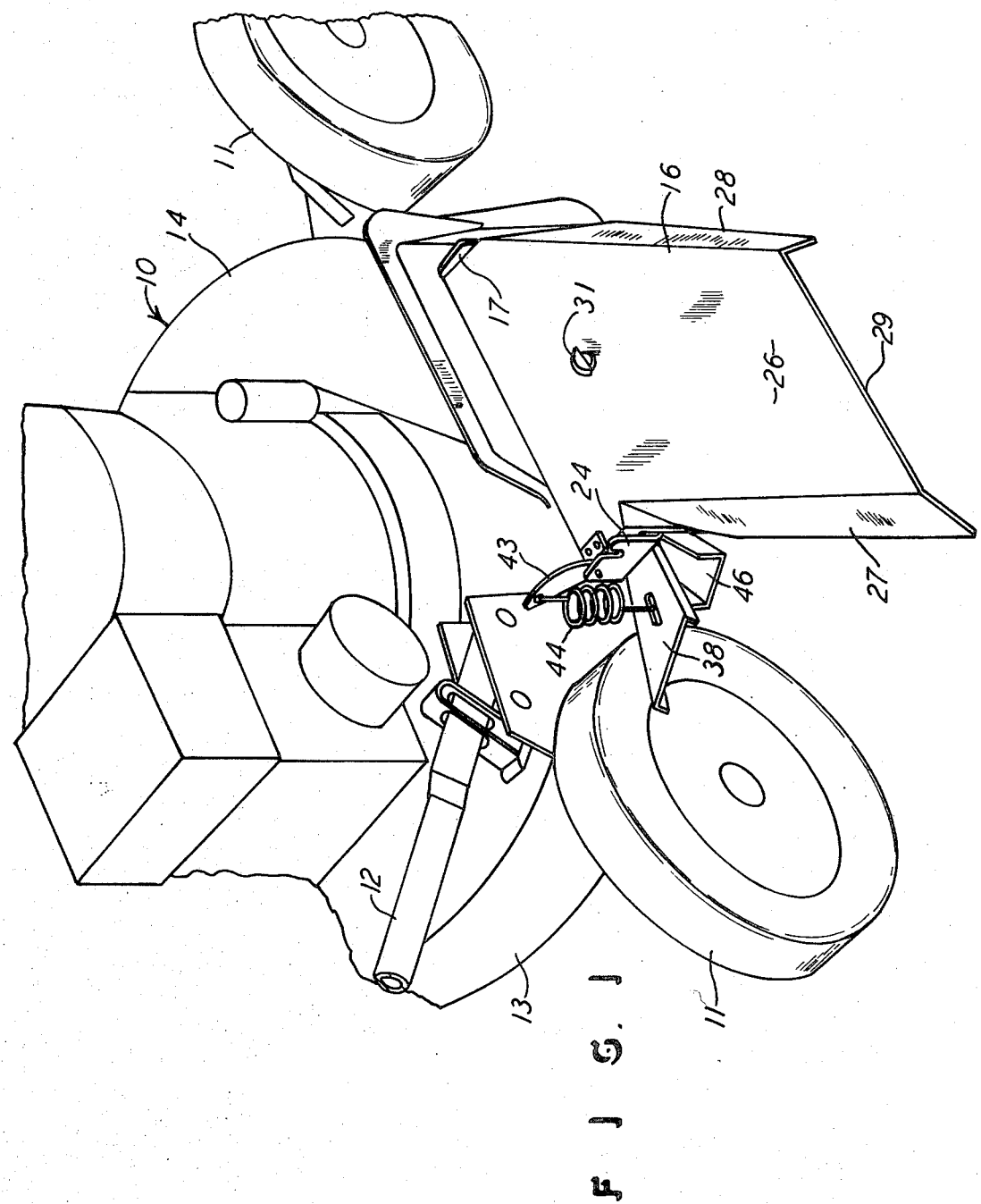
FIG. 1 is a rear perspective view of a fragment of a rotary mower and with the embodiment of a hinged chute of this invention.

A rotary law mower 10 is provided with the usual ground wheels 11 and with a rearwardly extending steering handle 12. The mower 10 has its usual housing 13 which includes a spirally extending discharge chute 14 which directs the grass clippings toward the right rear side of the mower, in the usual arrangement.

Figure 2:
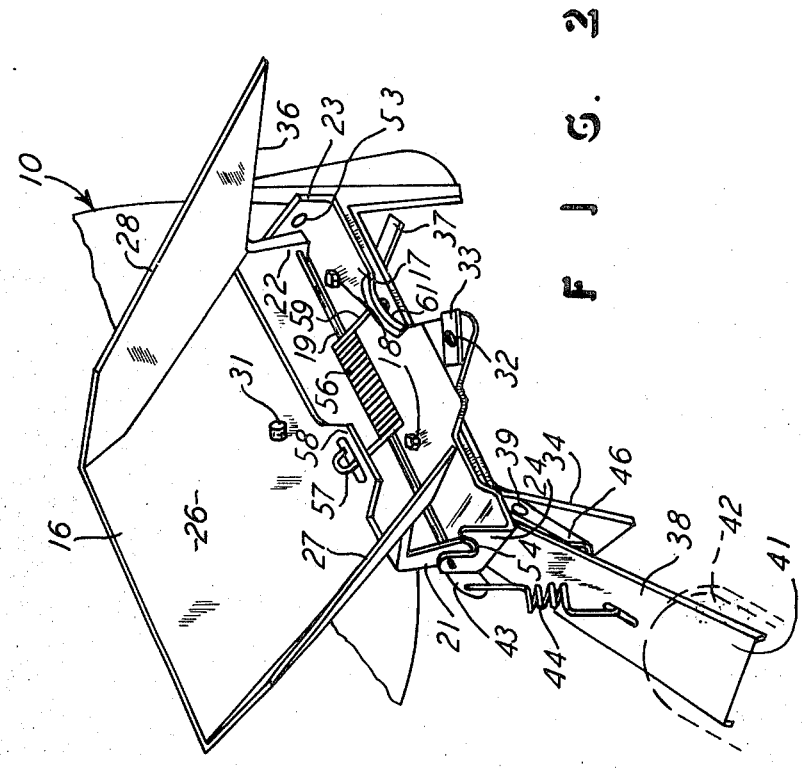
FIG. 2 is a rear perspective view similar to FIG. 1 but showing the hinged chute in the raised position.

A hinged chute 16 is hingedly mounted on the mower housing 13 through a support bracket or member 17 which is shown in FIG. 2 to be secured to the mower housing 13 by means of bolts 18. A horizontally extending hinge rod 19 is releasably retained in the bracket 17 and it engages arms or sides 21 and 22 of the chute 16 to hingedly mount the chute 16 about the horizontal axis defined by the rod 19. It will of course be understandable that the bracket 17 is U-shaped and has upstanding leg portions 23 and 24 which actually receive the ends of the rod 19 for the hinge mounting described.

The hinged chute 16 has a top 26 and two depending side walls 27 and 28, and thus the chute 16 forms a grass clipping outlet at the end of the chute away from the hinge rod 19, such as shown by the numeral 29 which designates the outlet area. FIG. 1 therefore shows the chute 16 in its lowered and horizontal operating position which guides the grass clippings horizontally and laterally of the mower 10, as desired. A releasable fastener, in the form of a wing nut 31, is attached to the chute 16 and it engages the bracket 17, through the threaded opening 32 in the clip 33 shown in FIG. 2 and secured to the bracket 17. Thus the wing nut 31 and clip 33 serve as the fastener to retain the hinged chute 16 in the downward position for directing the grass, laterally, as mentioned. That is, FIG. 2 shows that the mower housing spiral chute or outlet 14 terminates in an outlet opening 34, and the hinged chute 16 has its inner end 36, that is the end adjacent the mower housing 13, of a shape conforming to the mower housing outlet opening 34. Thus the hinged chute 16 provides an extension to the mower spiralled outlet 14, and it forms a continuation of the passageway from the mower as defined and shown by the mower outlet 34. With this arrangement, by virtue of the hinged chute 16 forming an extension to the mower outlet, the clippings are further guided laterally of the mower, and also the operator cannot inadvertently step into the opening 34 and into the path of the mower blade 37 which is rotating past the opening 34.

With the hinged chute in the lowered and secured position shown in FIG. 1, the mower is normally operating but without a grass catcher bag thereon. When it is desired to mount a grass catcher bag, then the chute 16 must be manipulated to permit mounting of the bag directly onto the mower housing 13. Of course the catcher bag itself would be of a general construction, and such bags are commonly used in the art, and an example of one is found in U.S. Pat. 3,112,597 where rods are shown supporting a canvas type bag and with the rods having mounting ends for mounting the entire bag assembly onto the mower housing 13. To manipulate the hinged chute 16 and yet permit the operator to use both hands for manipulating the bag itself while it is being mounted onto or removed from the mower housing 13, a pedal 38 is provided. The pedal 38 is pivotally mounted on the mower housing through a pivot pin 39 which is suitably supported on the mower housing in any conventional manner. Thus the pedal end 41 will move up and down about the horizontally disposed pivot pin 39, and FIG. 2 shows a portion of an operator's shoe designated 42 and shown in dotted lines, and the shoe 42 is depressing the pedal 38 to raise the hinged chute 16, all as shown in FIG. 2.

A connector extends between the pedal 38 and the hinged chute 16 for transmitting the pedal pivot action to the hinged chute 16 as seen in FIG. 2. The connector is shown to include an arm 43 which is fixedly secured to the chute 16, and it includes a tension spring 44 having its opposite ends attached to the arm 43 and to the pedal 38, as shown in FIGS. 1 and 2. With the control including the spring 44, when the hinged chute 16 is in its maximum raised position, such as might be determined by the limit of pivot to the hinged member 16 as it abuts any portion of the mower or the like, the spring 44 will simply extend and permit further pivoting of the pedal 38 to a maximum limit even though the chute 16 is no longer pivoting. A stop 46 is affixed to the mower housing and extends below the pedal 38 to limit the pivotal movement of the pedal 38 and thereby permit the operator to firmly depress the pedal 38 and obtain sure footing while manipulating the catcher bag into a mounted position on the mower.

Figure 3:
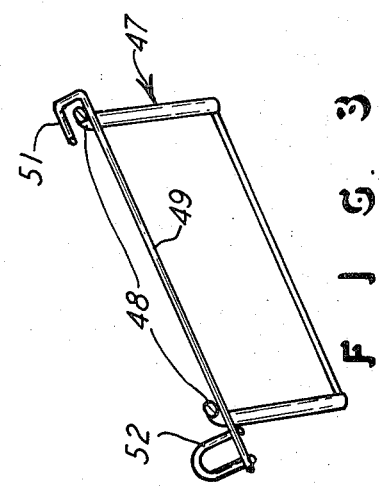
FIG. 3 is a perspective view of a fragment of the grass catcher frame useful in mounting on the mower shown.

FIG. 3 shows a front portion of the catcher bag frame 47, and this frame is shown to be rectangular and conforms to the mower opening 34. Further, it will be understood that the frame has bars or rods 48 extending rearwardly on the catcher, though the rods are sectioned off as seen in FIG. 3, and these rods 48 support the catcher bag which is not shown but would be of a conventional construction. The frame 47 has a top bar 49 which carries a hook 51, on one end thereof, and which carries a loop 52, on the other end thereof. With reference to FIG. 2, it will be seen and understood that the hook 51 can be initially inserted into an opening 53 on the U-shaped bracket 17, and the loop 52 would then be laid into the slot 54 on the other end of the U-shaped bracket 17. In this manner, the grass catcher bag is readily and easily secured to the mower, and the operator can use both hands for manipulating the catcher bag to achieve the mounting just described, as the operator's shoe is holding the pedal 38 in the depressed position to place the hinged chute 16 in a substantially vertical position shown in FIG. 2. In the FIG. 2 position, the operator has visibility of the mounting portions 53 and 54 of the support member 17.

Thus the hinged chute 16 is shown to be cantilever mounted on the mower, and it can lower under its own weight when the operator removes his foot from the pedal 38. Preferably, there is a spring 56 on the hinge pin 19 for exerting a spring force on the chute 16 and returning it to the FIG. 1 position. Thus, one end 57 of the spring 56 is hooked into a bracket 58 on the chute 16, and the spring other end 59 is hooked into a raised portion 61 on the bracket 17. The spring 56 can hold the deflector 16 down in FIG. 1 position, but it is weaker than the spring 44, so depressing the pedal raises the deflector. Also, the fasteners 31 and 33 could be eliminated, if desired, but it could be used when the pedal 38 is not to be used.

Also, the arrangement is such that when the operator depresses the pedal 38 he is in a firm footing position and the pedal end 41 is not forced into the turf to damage the turf. Thus the stop 46 serves the purpose of locating the depressed pedal 38 in the limited but firm position mentioned.

What is claimed is:

1. A pedal controlled hinged chute for lawn mowers having a mower housing and being arranged to mount a grass catcher bag, comprising a chute, a hinge-type mounting supported on said housing for hingedly mounting said chute, a pedal movably supported on said housing, and a connector attached between said pedal and said chute for transmitting movement of said pedal to said chute to hingedly move said chute.

2. The pedal controlled hinged chute as claimed in claim 1, wherein said chute is hingedly mounted on a horizontal axis in a cantilever type of mounting to be raised by depressing said pedal and to be lowered under its own weight horizontally offset from the horizontal axis.

3. The pedal controlled hinged chute as claimed in claim 2, wherein said connector includes a tension spring for exerting a pulling force on said chute when said pedal is depressed.

4. The pedal controlled hinged chute as claimed in claim 3, including a stop on said housing and in the path of movement of said pedal to limit the movement of said pedal when said pedal is depressed.

5. The pedal controlled hinged chute as claimed in claim 1, including a grass catcher bag mounting supported on said housing below said chute and positioned relative to the hinge movement of said chute to be visible from above by the operator when said pedal is being depressed by the operator's foot and said chute is hingedly moved upwardly.

6. The pedal controlled hinged chute as claimed in claim 1, including a releasable fastener connectable between said chute and said housing to hold said chute in its lowered position.

7. The pedal controlled hinged chute as claimed in claim 1, wherein said chute is hingedly mounted on a horizontal axis in a cantilever type of mounting and extends outwardly from said housing, and including a grass catcher bag mounting supported by said housing adjacent the hinge of said chute and being exposed when said chute is hingedly moved upwardly so that a grass catcher may be mounted thereon.

References Cited

UNITED STATES PATENTS

| | | | |
|---|---|---|---|
| 3,112,597 | 12/1963 | Heth et al. | 56—202 |
| 2,970,422 | 2/1961 | Kroll et al. | 56—202 |
| 3,132,457 | 5/1964 | Slemmons | 56—202 |
| 3,220,170 | 11/1965 | Smith et al. | 56—255 |
| 3,404,519 | 10/1968 | Demers | 56—320.2 |
| 3,423,918 | 1/1969 | Siwek | 56—202 |

RUSSELL R. KINSEY, Primary Examiner

U.S. Cl. X.R.

56—320.2